US010288821B2

(12) United States Patent
Isenhour

(10) Patent No.: US 10,288,821 B2
(45) Date of Patent: May 14, 2019

(54) FIBER OPTIC CABLE ASSEMBLIES FOR TERMINATING FIBER OPTIC CABLES USING A RETENTION COMPONENT AND METHODS OF MAKING

(71) Applicant: Corning Optical Communications LLC, Hickory, NC (US)

(72) Inventor: Micah Colen Isenhour, Lincolnton, NC (US)

(73) Assignee: Corning Optical Communications, LLC, Hickory, NC (US)

( * ) Notice: Subject to any disclaimer, the term of this patent is extended or adjusted under 35 U.S.C. 154(b) by 35 days.

(21) Appl. No.: 15/150,681

(22) Filed: May 10, 2016

(65) Prior Publication Data

US 2016/0334587 A1 Nov. 17, 2016

Related U.S. Application Data

(60) Provisional application No. 62/162,155, filed on May 15, 2015.

(51) Int. Cl.
*G02B 6/38* (2006.01)

(52) U.S. Cl.
CPC .......... *G02B 6/3887* (2013.01); *G02B 6/3869* (2013.01)

(58) Field of Classification Search
CPC .............................. G02B 6/3887; G02B 6/3869
See application file for complete search history.

(56) References Cited

U.S. PATENT DOCUMENTS

| | | | | |
|---|---|---|---|---|
| 4,418,983 | A | * | 12/1983 | Bowen ................. G02B 6/3838 385/62 |
| 5,862,289 | A | * | 1/1999 | Walter ................. G02B 6/3855 385/134 |
| 6,899,467 | B2 | | 5/2005 | McDonald et al. |
| 7,090,406 | B2 | | 8/2006 | Melton et al. |
| 7,090,407 | B2 | | 8/2006 | Melton et al. |
| 7,111,990 | B2 | | 9/2006 | Melton et al. |
| 7,113,679 | B2 | | 9/2006 | Melton et al. |
| 7,137,742 | B2 | | 11/2006 | Theuerkorn et al. |
| 7,244,066 | B2 | | 7/2007 | Theuerkorn |

(Continued)

FOREIGN PATENT DOCUMENTS

WO 2013/019465 A1 2/2013
WO 2013/025855 A1 2/2013

OTHER PUBLICATIONS

International Search Report and Written Opinion PCT/US2016/031567 dated Aug. 5, 2016.

*Primary Examiner* — Akm E Ullah
(74) *Attorney, Agent, or Firm* — Michael E. Carroll, Jr.

(57) ABSTRACT

A fiber optic cable assembly for terminating a fiber optic cable along with a method for making the same are disclosed. The fiber optic cable assembly comprises a fiber optic cable having at least one optical waveguide and a jacket, at least one retention component, and a retention body. The retention component is attached to a portion of the jacket of the fiber optic cable to form a retention component sub-assembly. The retention body has an insertion end and a passage extending at least partially along a length of the retention body. The retention component sub-assembly is inserted into the passage so that the at least one retention component is secured to the retention body to complete the fiber optic cable assembly.

37 Claims, 7 Drawing Sheets

(56) References Cited

U.S. PATENT DOCUMENTS

| | | |
|---|---|---|
| 7,264,402 B2 | 9/2007 | Theuerkorn et al. |
| 7,572,065 B2 | 8/2009 | Lu et al. |
| 7,654,747 B2 | 2/2010 | Theuerkorn et al. |
| 7,677,814 B2 | 3/2010 | Lu et al. |
| 7,744,288 B2 | 6/2010 | Lu et al. |
| 7,785,019 B2 | 8/2010 | Lewallen et al. |
| 7,942,590 B2 * | 5/2011 | Lu ................. G02B 6/3816 385/78 |
| 8,506,173 B2 | 8/2013 | Lewallen et al. |
| 8,556,520 B2 | 10/2013 | Elenbaas et al. |
| 8,915,659 B2 * | 12/2014 | Marcouiller ......... G02B 6/2551 385/95 |
| 2008/0080817 A1 * | 4/2008 | Melton ............... G02B 6/3849 385/81 |
| 2008/0175541 A1 | 7/2008 | Lu et al. |
| 2009/0257717 A1 * | 10/2009 | Liu .................... G02B 6/3833 385/66 |
| 2012/0328248 A1 | 12/2012 | Larson et al. |

* cited by examiner

FIBER OPTIC CABLE ASSEMBLIES FOR TERMINATING FIBER OPTIC CABLES USING A RETENTION COMPONENT AND METHODS OF MAKING

CROSS-REFERENCE TO RELATED APPLICATIONS

This application claims the benefit of priority to U.S. Provisional Application No. 62/162,155, filed on May 15, 2015, and is incorporated herein by reference.

BACKGROUND

Optical fiber connectors are an essential part of optical fiber communication systems, and are used for terminating an optical transmission component such as an optical fiber of a fiber optic cable. Stated another way, optical fiber connectors are widely used for providing a mating/unmating connection point in an optical network, connecting different optical fibers, and terminating optical fibers for optical connection with other devices, such as closures, multiports, optical transmitters, receivers, isolators, attenuators, amplifiers, power meters, and detectors. When terminating a fiber optic cable with a fiber optic connector, the fiber optic cable should be secured to the fiber optic connector in a suitable manner to withstand pulling and side-load forces that may be experienced during installation and use. Moreover, the termination process should be relatively quick, easy and cost-effective.

Fiber optic connectors may be designed for terminating one specific fiber optic cable design and consequently may have difficultly being adapted for terminating other fiber optic cable designs. For instance, fiber optic cable designs may have different cross-sectional shapes, cross-sectional dimensions and/or materials and a fiber optic connector was intended for a specific fiber optic cable design may have difficultly being adapted for other fiber optic cable designs. Further, even the same fiber optic cable design may have manufacturing variations in the outer dimensions that can make terminating the fiber optic cable with a fiber optic connector challenging. Moreover, customers may have a desire to use a specific fiber optic connector for their network, but want to use a fiber optic cable design different from the fiber optic cable that the connector was initially designed to use. Thus, there is an unresolved need for assemblies used for terminating a fiber optic cable with a fiber optic connector using different fiber optic cable designs than the connector was intended to use.

SUMMARY

A fiber optic cable assembly for terminating a fiber optic cable along with a method for making the same are disclosed. The fiber optic cable assembly comprises a fiber optic cable having at least one optical waveguide and a jacket, at least one retention component, and a retention body. The retention component is attached to a portion of the jacket of the fiber optic cable to form a retention component sub-assembly. The retention body has an insertion end and a passage extending at least partially along a length of the retention body. The retention component sub-assembly is inserted into the passage so that the at least one retention component is secured to the retention body to complete the fiber optic cable assembly.

Other embodiments may be directed to fiber optic cable assembly for terminating a fiber optic cable comprising at least one optical waveguide and a jacket. The fiber optic cable assembly comprises a first retention component and a second retention component with the first and second retention components being attached to a portion of the jacket of the fiber optic cable to form a retention component sub-assembly. The retention body having an insertion end and a passage extending at least partially along a length of the retention body, wherein the retention component sub-assembly is inserted into the passage so that the at least one retention component is secured to the retention body. The fiber optic cable assembly can be further assembled to any suitable fiber optic connector style or footprint.

Also disclosed are methods of terminating a fiber optic cable. The method comprising providing a fiber optic cable having at least one optical waveguide and a jacket and providing a first retention component. The method also comprises pressing the first retention component into the jacket of the fiber optic cable to form a retention component sub-assembly. The method also provides a retention body comprising an insertion end and a passage extending at least partially along a length of the retention body, and inserting a first end of the fiber optic cable of the retention component sub-assembly into the passage of the retention body so that the at least one retention component is secured to the retention body. Other steps may be employed in the method of terminating the fiber optic cable.

Also disclosed are fiber optic retention component sub-assemblies. The sub-assemblies, comprise a fiber optic cable having at least one optical waveguide and a jacket, and a first metal retention component. The first metal retention component is attached to a portion of the jacket of the fiber optic cable, wherein the at least one retention component deforms the jacket where attached. Thus, a robust attachment of the first metal retention component occurs for cable strain-relief.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments. [If there are no appended drawings, amend accordingly.

DETAILED DESCRIPTION

Figure 1:
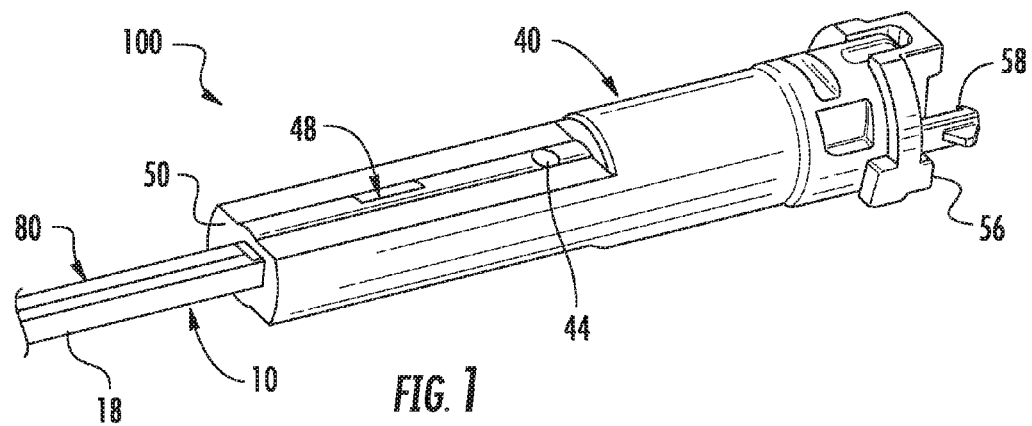
FIG. 1 is a perspective rear view of a fiber optic cable assembly for terminating a fiber optic cable according to one embodiment.
Figure 2:
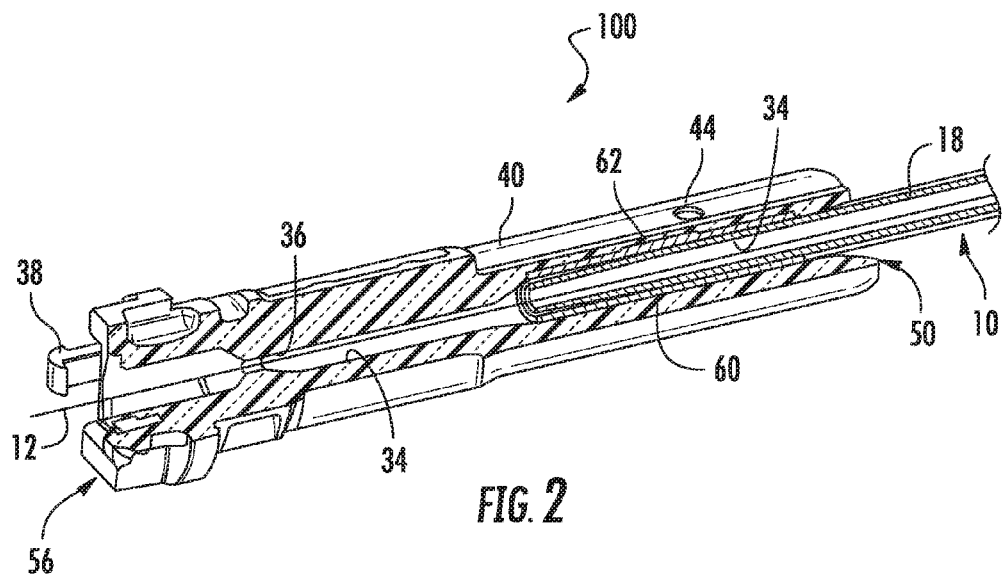
FIG. 2 is a partial front cut-away view of the fiber optic cable assembly of FIG. 1.
Figure 5:
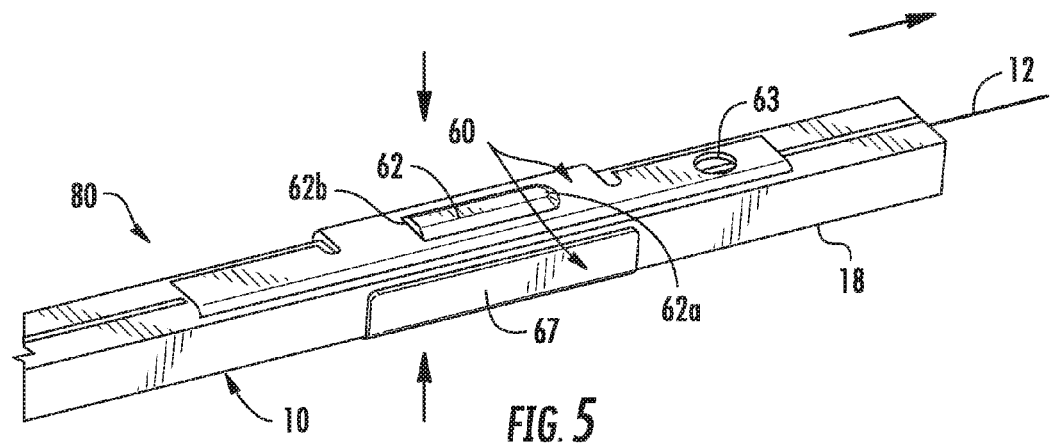
FIG. 5 is a perspective view of a retention component sub-assembly before being inserted into a passage of a retention body.

FIG. 1 is a perspective view of a fiber optic cable assembly 100 for terminating a fiber optic cable 10 (hereinafter "cable") according to one embodiment. Cable 10 has at least one optical waveguide 12 and a jacket 18 and may optionally include other cable components. As shown in FIG. 2, at least one retention body 40 is secured to cable 10 using at least one retention component 60 for forming fiber optic cable assembly 100, which is a sub-assembly for a connectorized cable that may include a ferrule attached to the optical waveguide. The at least one retention body component 40 is attached to a portion of the jacket 18 of cable 10, thereby forming a retention component sub-assembly 80 such as depicted in FIG. 5.

The retention body 40 has an insertion end 50 and a passage 34 extending at least partially along a length of the retention body 40. The retention component sub-assembly 80 (FIG. 5) is inserted into the passage 34 from the insertion end of the retention body 40 so that the at least one retention component 60 is secured to the retention body 40. Retention body 40 can be constructed from any relatively rigid material, such as plastics and metals. In the illustrated embodiment, the retention body 40 is made from a suitable plastic. The concepts disclosed allow the termination of a variety of different cable designs in a quick, easy and cost-effective manner while providing a robust solution.

Retention body 40 and one or more retention component(s) 60 may take any suitable form for accommodating different cable types and sizes as desired by modifying the retention component(s) 60 or the passage of the retention body 40. These modifications for different designs are easily made by changing metal stamping/forming tools for the retention components and/or by changing mold inserts for creating the passageway of the retention body. Likewise, the retention body 40 can be modified for different types of connector types such as LC, SC, ST, MTP, MPO, etc. Thus, the concepts disclosed provide a high-degree of flexibility to change designs for market demand. Other methods of accommodating various cable types within a common retention body are also possible with the concepts disclosed. For instance, shaping (i.e., shaving or trimming) the end of the cable during the termination process as needed to fit the at least one retention component 60 and/or passage 34 of the retention body 40 is possible if the cable is oversized. In other variations, the cable may also be shaped such as shaved for providing easier access to and/or expose the strength members of the cable so that the retention component(s) can be tied into the strength members. However, embodiments may have a suitable retention strength by having the retention component(s) tied into a suitable portion of the cable jacket. By way of example, the retention component(s) 60 may be pressed into the cable jacket over a suitable length for providing a high-degree of strength without tying into the strength members of the cable. Moreover, the cable jacket 18 may be deformed about the retention component(s) 60 as they are pressed into place.

Figure 3:
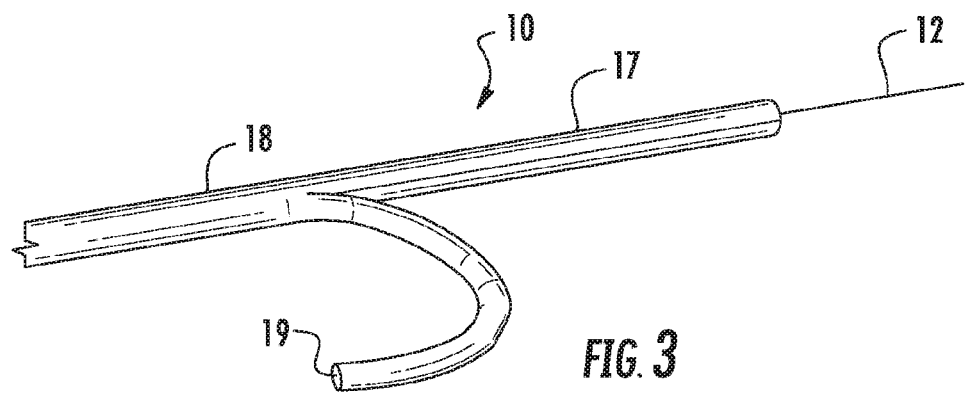
FIG. 3 is a perspective view showing a first explanatory fiber optic cable prepared for termination and that can be used with the concepts disclosed herein.
Figure 4:
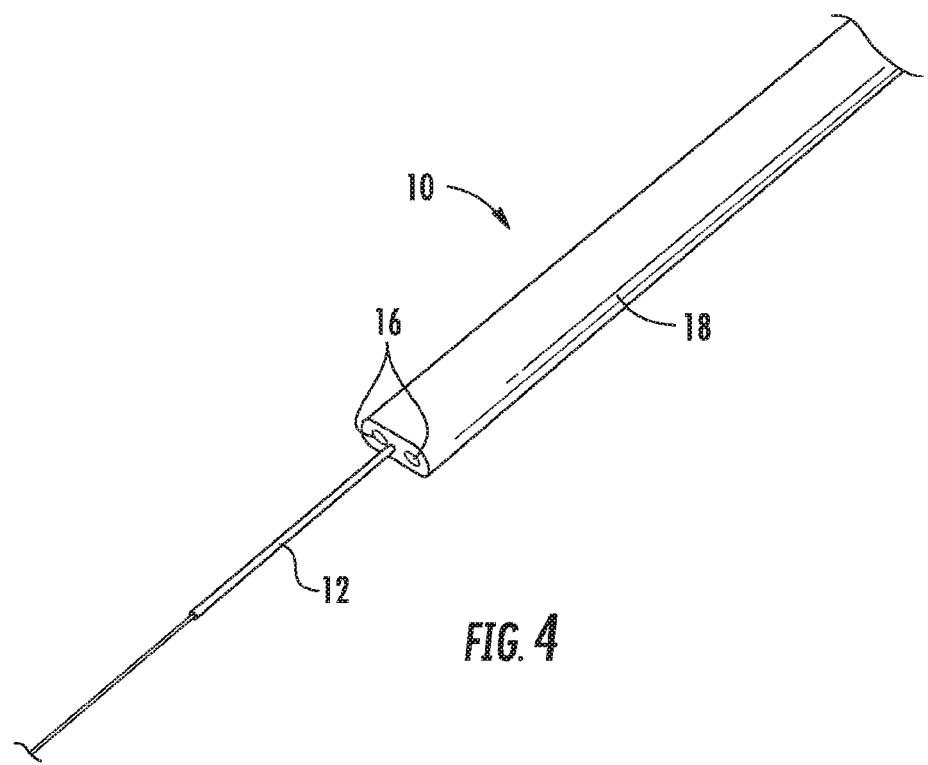
FIG. 4 is a perspective view showing a second explanatory fiber optic cable prepared for termination and that can be used with the concepts disclosed herein.

Cable 10 can have any suitable cable design comprising at least one optical waveguide 12 and a jacket 18. FIGS. 3 and 4 depict two different explanatory cables 10 that may be used with the concepts disclosed, but other suitable cable designs are possible. Optical waveguide 12 may be any suitable optical transmission component such as, for example, an optical fiber available from Corning Incorporated of Corning, N.Y. Other data, voice, etc. and other information transmitting media, such as metallic conductors, for example, may also be included in addition to optical waveguide 12. The illustrated embodiments show cables 10 having a single optical waveguide for clarity, but the concepts may be used with a plurality of optical waveguides 12 attached to a multi-fiber ferrule or multi-fiber connector. The cable 10 can also have other cable components as known.

As shown in FIG. 3, the first end of the cable 10 is prepared for termination by removing a portion of the cable jacket 18 at the insertion end of the cable 10 and preparing the optical waveguide 12. The removal of a portion of the jacket and preparing the optical waveguide 12 may be performed before or after securing the one or more retention component(s) 60 as desired. In this cable embodiment, one or more strength members 16 disposed in a messenger section 19 can be pulled away from a main body 17 of the cable that includes the optical waveguide 12 over a specified length at the insertion end of the cable 10. During assembly of this cable design the retention component(s) 60 are secured to the main body 17 as desired. Consequently, the retention component(s) 60 are not tied into the strength members of the cable 10, but instead are secured to a portion of the jacket 18 of the main body 17.

The jacket 18 of cable 10 can be generally described as a 'polymeric' material. In this specification, the terms "polymer" and "polymeric" indicate materials comprised primarily of extrudable polymer materials such as, for example, copolymers, but allows for the presence of non-polymer materials such as additives and fillers for flame retardancy or other reasons. An example of polymers suitable for use in cable jackets according to the present embodiments includes polyethylene, polypropylene, and the like. The polymeric material of jacket 18 may be deformed by the retention component(s) 60 that is secured to a portion of the jacket 18. For instance, the one or more retention component 60 may be pressed into the jacket 18 and as a result deform a portion of the jacket 18 for providing robust attachment for strain relief.

FIG. 4 depicts another cable 10 having at least one optical waveguide 12 and a jacket 18. This cable design has two strength members 16 disposed within jacket 18 and disposed on opposite sides of optical waveguide 12. Strength members 16 may be, for example, elongate rigid elements extending along the length of a cable that provide anti-buckling strength to the cable. Examples of rigid strength components include dielectric rods, metallic rods, and similar materials. In one embodiment, the strength members 16 can be glass reinforced plastic (GRP) rods. Strength members can also include one or more tensile yarns extending along the length of a cable that generally do not provide anti-buckling strength for the cable such as aramid yarns, such as yarns available under the brand name KEVLAR, disposed within or inside or the cable jacket. The concepts disclosed herein may be used with suitable cable designs use either type of strength members.

FIG. 5 is a perspective view of a retention component sub-assembly 80 (cable 10 and one or more retention components 60 attached to a portion of jacket 18) before being inserted into a passage 34 of retention body 40. As shown in this embodiment, first and second retention components 60 are pressed into cable jacket 18 and are generally aligned with each other as depicted. The first and second retention components 60 are pressed into cable jacket 18 with a force to at least partially deform the cable jacket 18 in desired location for securing the retention components in a suitable manner. This may be accomplished using a suitable installation fixture (i.e., jig) and press for securing the retention components 60 to cable 10 in a consistent and repeatable manner. Retention component(s) 60 may include an alignment feature 63 for registration of the components in the installation fixture for a consistent and repeatable process.

The insertion end 50 of the retention body 40 through which the cable 10 retention component sub-assembly 80 is inserted during assembly is shaped to accommodate and secure the retention component(s) to the retention body 40. During termination, it is desirable that the retention component sub-assembly 80 be relatively stable, immobile, and centered within the passage 34 of retention body 40 while still being secured in a suitable manner.

Retention component sub-assembly 80 is inserted into the passage 34 from the insertion end (e.g. rear end) of retention body 40 and advanced toward a front end 56 of the retention body 40 until the retention component(s) 60 are secured to the retention body 40. For example, the retention component sub-assembly 80 is inserted and advanced until a mechanical locking feature 62 engages a complimentary feature of the retention body 40. By way of example, the mechanical locking feature 62 may cooperate with a window 48 of the retention body 40 for securing the retention component of sub-assembly 80 with the retention body 40 and make assembly 100 depicted in FIG. 1. Stated another way, the mechanical locking feature 62 engages with the window 48 so that retention component sub-assembly 80 is fixed in position and may not have substantial movement in the forward or reward direction relative to the retention body 40. The retention component(s) 60 may also position, such as by centering, the retention component sub-assembly 80 within the passage 34 of retention body 40 as it is inserted.

Retention component 60 may be formed as a single component or multiple components that attach to one or more sides of the cable. For instance, the retention component may be configured as a single piece that is secured to cable 10 and is secured to one or more sides of the cable. In the embodiment depicted, two identical retention components 60 are used that engage the major sides of the cable from opposite sides, but other embodiments may have multiple retention components that are not identical.

During the assembly process, an optional filler or bonding agent, such as a compound comprising a glue, epoxy, or some other bonding, and/or sealing substance may be introduced in fluid form through an aperture 44 into a section of the passage 34. The retention body 40 may also include a vent for letting air escape as the filler or bonding agent are injected. Any suitable type of bonding agent may be used as a filler agent and provides a barrier for inhibiting moisture from entering into the assembly through passage 34. By way of example, the filler or bonding agent may be radiation curable epoxy such as a visible light curable epoxy or an ultraviolet (UV) light curable epoxy, a heat curable epoxy, adhesive, resin, glue, or the like for securing the same. If a radiation curable substance is used such as a light or UV curable epoxy, then the retention body 40 should be translucent for allowing the radiation to cure the radiation curable substance in a suitable manner. By way of example, a suitable filling/bonding agent is a 2-part heat curable epoxy available from Masterbond of Hackensack, N.J. under the tradename EP62-1TK. Another suitable filing/bonding agent having a thicker viscosity is available from Loctite of Moorsville, N.C. under the tradename Hysol-0151.

Figure 6:
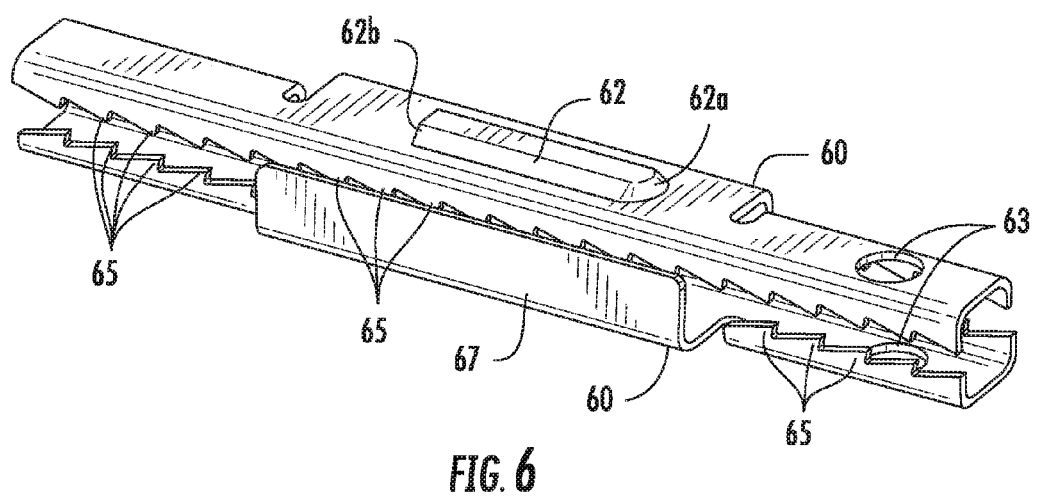
FIG. 6 is perspective view showing the retention components of FIG. 5 before being attached to the fiber optic cable.

FIG. 6 is perspective view showing the retention components 60 in the relative orientation for attachment to the cable, but with the cable 10 removed for clarity. As depicted, retention component 60 comprises at least one mechanical locking feature 62 for engaging with the retention body 40, but the each retention component 60 may have multiple mechanical locking features if desired. By way of example, the mechanical locking feature 62 comprises a raised portion of the at least one retention component such as depicted. Mechanical locking feature 62 allows the retention component sub-assembly 80 to be inserted from the insertion end 50 into the passage 34 of the retention body 40 until it is fully inserted and then the mechanical locking feature 62 secures the retention component 60 to the retention body 40. The mechanical locking feature may comprise a stop at the rear end that allows a snap-fit to the retention body 40 and inhibit excessive rearward movement once secured.

In this embodiment, the mechanical locking feature 62 is a ridge disposed on a side of the retention component 60. Ridge is longitudinally disposed on the retention component 60 with a nose 62a that acts as a ramp at the leading edge and a ledge 62b at the trailing edge that acts as a stop for securing to the window 48 of retention body 40. The ridge allows insertion of the retention component sub-assembly 80 into the passage 34 in one direction until is fully inserted and then secured. In other embodiments, the mechanical locking feature may be a raised finger or other structure that allows insertion of the retention component sub-assembly and mechanical locking when fully inserted.

Figure 7:
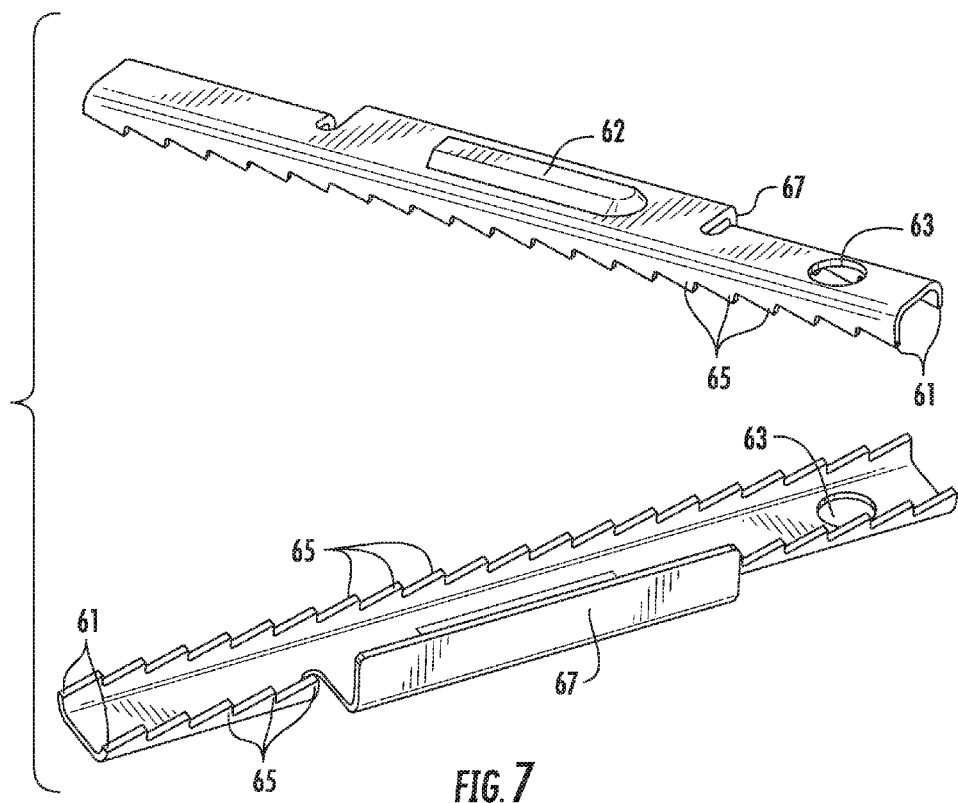
FIG. 7 is another perspective view showing the retention components of FIG. 5 before being attached to the fiber optic cable.
Figure 8:
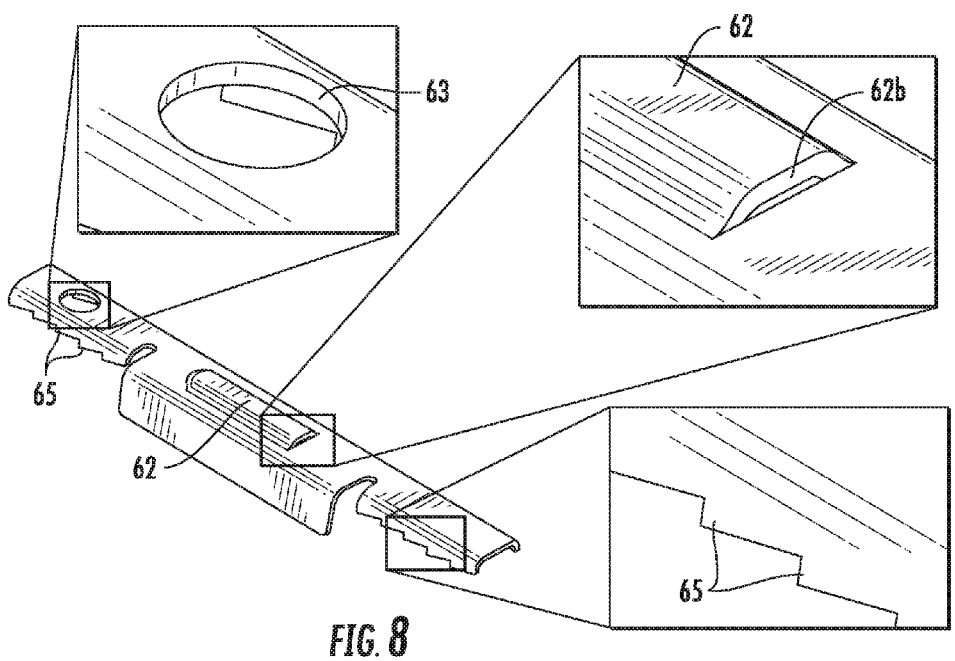
FIG. 8 is another perspective view of the retention component with various detailed views.

FIGS. 7 and 8 are perspective views showing further details of the retention components 60. As depicted, retention component(s) having a plurality of teeth 65 for gripping the cable jacket 18. In this embodiment, the teeth 65 are disposed on respective rails 61 of retention component(s) 60. As best shown in FIGS. 5 and 6, the rails 61 are disposed so that they are slightly inboard of the tabs 67 of retention component(s) 60 that abut the outer surface of cable 10 when secured to the cable 10. Consequently, the plurality of teeth engage the cable jacket 18 inward of the outer edge of the cable for getting a bite into the material of the cable jacket. Moreover, this may align and secure the retention component(s) 60 closer to any strength members that may be embedded in the cable 10. Retention component(s) 60 are made from a suitable material that generally holds its shape and that can be pressed into the cable jacket 18. By way of example, retention component(s) are formed from metal such as steel and have a suitable size and shape for securing to the desired cable and fitting into passage 34 of retention body 40. Using a metal material for retention component(s)

allows quick and easy manufacturing such as by stamping the parts and also allows for easy design changes for different cable types.

Fiber optic cable assembly 100 of FIG. 1 may further include a ferrule 70 attached to the at least one optical waveguide 12 of cable 10. Assembly 100 may be connectorized in the field or the factory by attaching ferrule 70 to optical waveguide 12 for plug and play connectivity. For instance, assembly 100 may be a portion of a fiber optic connector, thereby forming a portion of a cable assembly.

Figure 9:
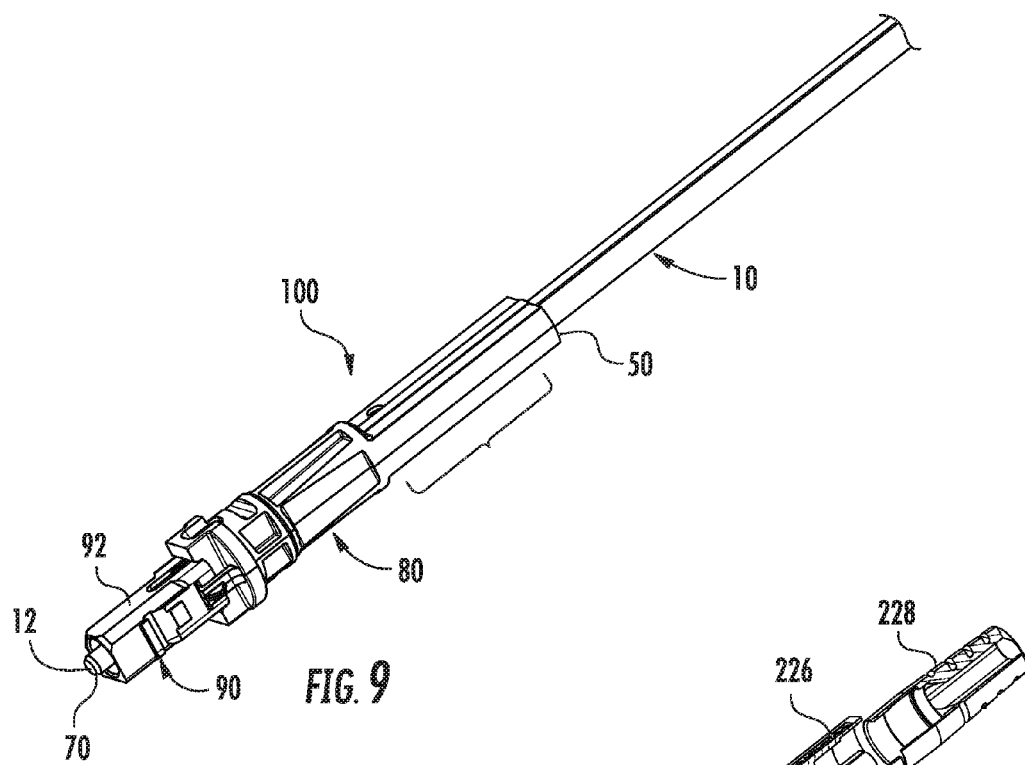
FIG. 9 is a perspective view showing a ferrule of a connector assembly attached to the at least one optical waveguide.

FIG. 9 is a perspective view showing a ferrule 70 of a connector assembly 90 attached to the at least one optical waveguide 12 of fiber optic cable assembly 100, thereby forming a cable assembly 200 that is suitable for mating with an adapter, port or other complimentary device. In this embodiment, front end 56 of the retention body 40 is configured to be connected to connector assembly 90 (FIG. 9), such as an assembly containing a ferrule, ferrule holder, connector housing etc. As shown, front end 56 of the retention body 40 comprises latches 58 (FIG. 1) for securing connector assembly 90. Specifically, latches 58 cooperate for attaching a connector housing 92 of the connector assembly to the retention body 40 as depicted. Although, connector assembly 90 is depicted as a SC type of connector assembly, other types of connector assemblies, such as LC, FC, ST, MT, MTP, MPO and MT-RJ, are also possible and contemplated with the concepts of the invention. Thus, many other suitable cable assemblies are possible with the concepts disclosed.

The concepts disclosed may also form a portion of a hardened connector. As used herein, a hardened connector refers to a robust fiber optic connector that is weatherproof, thereby making it suitable for use in the outside plant environment, but it is possible to use the hardened connector indoors. For instance, the craft may route the preconnectorized fiber optic cable having the hardened connector to a premises, a multi-port device, a network interface device (NID), an optical network terminal (ONT), a closure, or the like.

Figure 10:
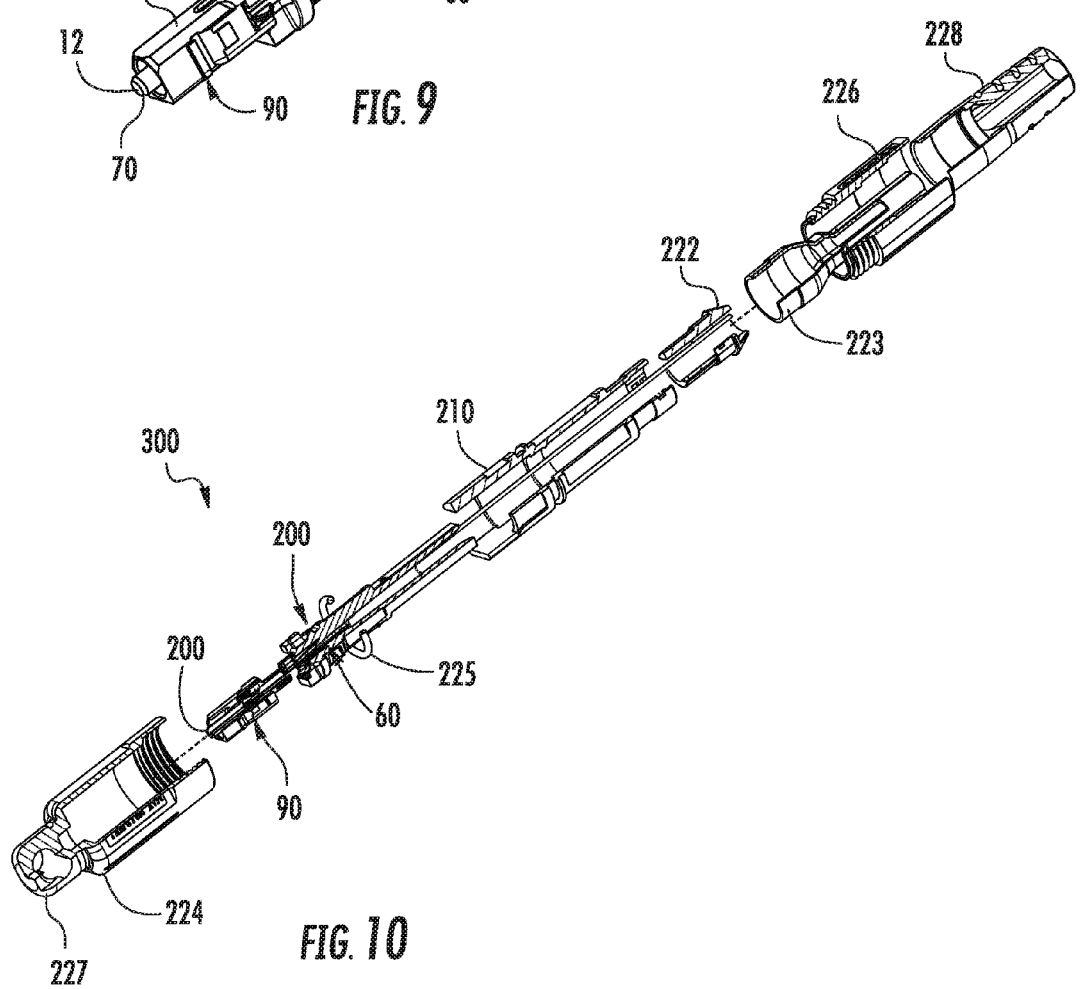
FIG. 10 is an exploded perspective view showing the fiber optic cable assembly being a portion of a hardened connector.
Figure 11:
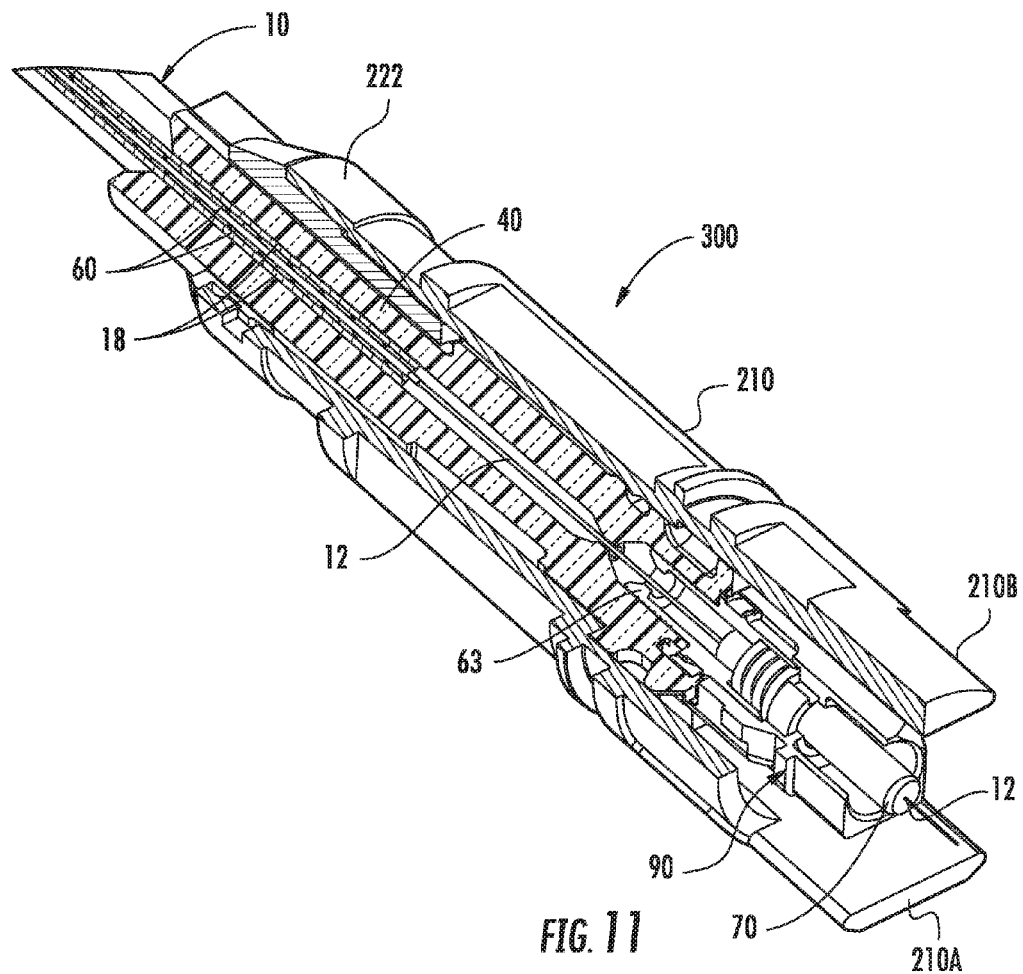
FIG. 11 is a partial sectional view showing a portion of the hardened connector of FIG. 10.
Figure 12:
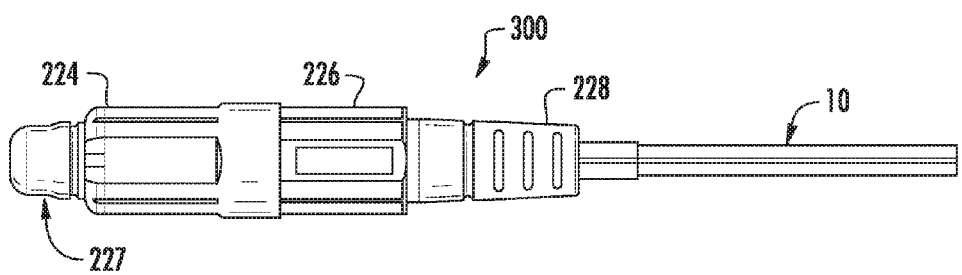
FIG. 12 is a plan view of the assembled hardened connector of FIG. 10.

FIG. 10 is an exploded perspective view showing the cable assembly 200 of FIG. 9 being a portion of a hardened connector 300. FIG. 11 is a partial sectional view of the hardened connector 300 and FIG. 12 is a plan view of the assembled hardened connector 300 with a protective cap installed over the connector assembly. The hardened connector 300 depicted in FIGS. 10-12 is similar to an Opti-Tap® connector available from Corning Optical Communications, LLC based in Hickory, N.C.

Hardened connector 300 includes assembly 200 of FIG. 9 and a shroud 210 for protecting the ferrule 70 and providing alignment during mating. Although, the hardened connector is shown with an SC connector assembly other types of connector assemblies are possible such as LC, FC, ST, MT, MTP, MPO, MT-RJ, etc. with the concepts disclosed. Thus, suitable fiber optic cables may be used with the retention body and/or fiber optic connector sub-assembly, thereby resulting in numerous fiber optic assembly combinations.

Hardened connector 300 may further includes end piece 222, a heat shrink 223, a protective cap 224, one or more O-rings 225, a coupling nut 226, and a boot 228. Protective cap 224 is provided that is configured to be placed about the connector assembly 90 for protecting connector assembly 90 and ferrule 70. Protective cap 224 is configured to threadly engage a coupling nut 226 that fits over shroud 210 and that can rotate thereabout. Coupling nut 226 is used for mating the hardened connector 300 with a complementary receptacle (not shown). One or more silicone O-rings 225 are disposed on shroud 210 to environmentally seal the protective cap 224 to the shroud 210 and/or with the complementary receptacle. Protective cap 224 may also incorporate an integral pulling eye 227 for pulling the assembly during installation and the like. Heat shrink 223 fits over a portion of shroud 210 and a portion of fiber optic cable 10 for sealing the interface therebetween. Boot 228 supports fiber optic cable 10 to inhibit and/or reduce sharp bending of the fiber optic cable 10 near an end of the hardened connector 300. Hardened connector 300 may also include a lanyard (not shown) for attaching protective cap 224 to the same.

Figure 13:
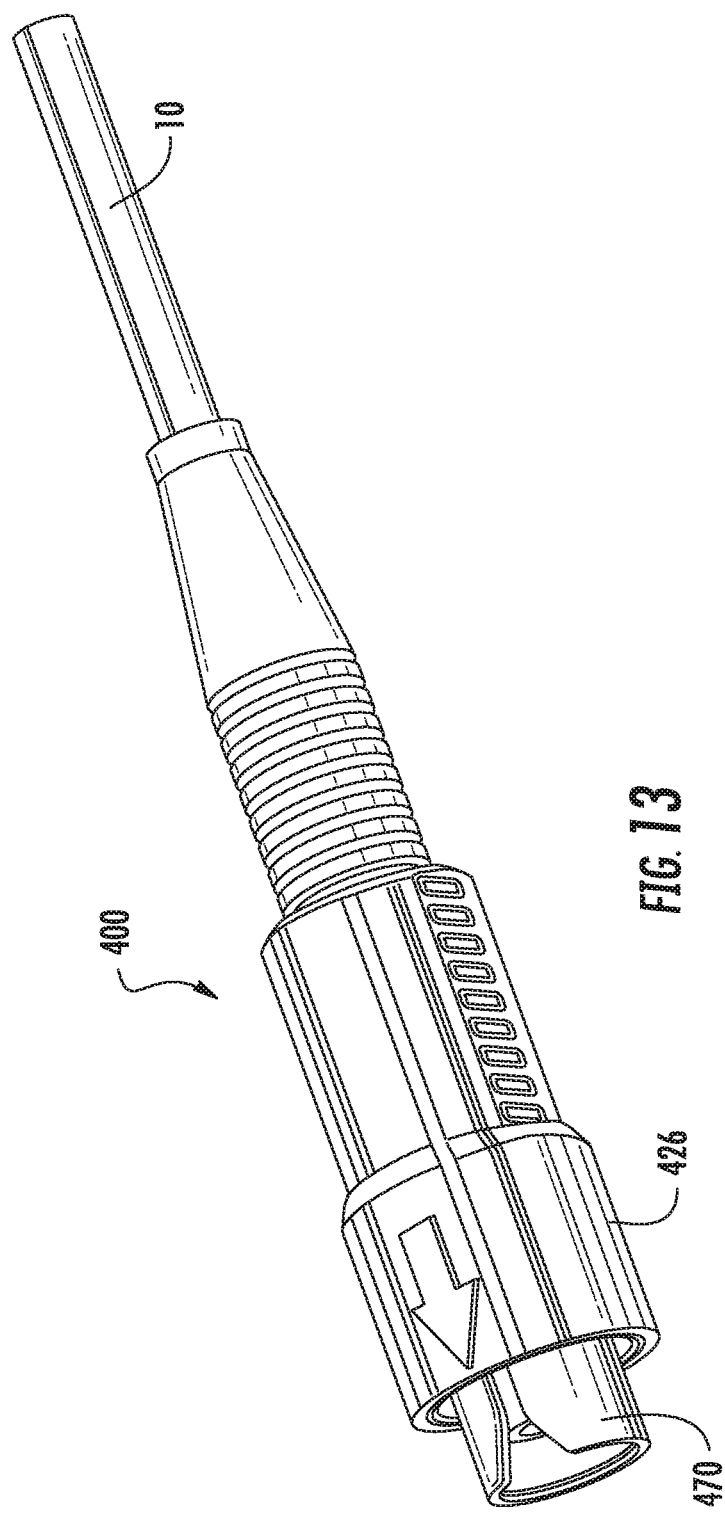
FIG. 13 is a perspective view of another hardened connector using the fiber optic cable assembly disclosed herein.

Fiber optic cable assembly 100 may be a portion of other connector assemblies and/or hardened connectors. By way of example, FIG. 13 is a perspective view of another type of hardened connector 400 using the fiber optic cable assembly 100. As depicted, hardened connector 400 has a shroud 470 similar to hardened connector 300, but the shroud 470 has a different form factor.

Methods of making the fiber optic cable assembly 100 are also disclosed along with methods of making the cable assemblies and hardened cable assemblies. The method includes the steps of providing a fiber optic cable having at least one optical waveguide and a cable jacket, securing at least one retention body to a portion of the cable to form a retention component sub-assembly, providing a retention body having an insertion end and a passage extending at least partially along a length of the retention body, and inserting the retention component sub-assembly into a passage of the retention body so that the at least one retention component is secured to the retention body.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the application should be construed to include everything within the scope of the appended claims and their equivalents.

What is claimed is:

1. A fiber optic cable assembly for terminating a fiber optic cable, comprising:
   the fiber optic cable having at least one optical waveguide and a jacket;
   at least one retention component being attached to a portion of the jacket of the fiber optic cable to form a retention component sub-assembly, wherein the at least one retention component comprises a plurality of teeth for gripping the jacket and a mechanical locking feature that is a ridge comprising a nose at the leading edge and a ledge at the trailing edge, and the at least one retention component is pressed into the jacket; and
   a retention body having an insertion end and a passage extending at least partially along a length of the retention body, wherein the retention component sub-assembly is inserted into the passage so that the at least one retention component is secured to the retention body so that the at least one mechanical locking feature engages the retention body.

2. The fiber optic cable assembly of claim 1, further comprising a first retention component and a second retention component attached to the jacket.

3. The fiber optic cable assembly of claim 1, wherein the at least one mechanical locking feature cooperates with a window of the retention body.

4. The fiber optic cable assembly of claim 1, wherein the at least one retention component comprises at least one an alignment feature.

5. The fiber optic cable assembly of claim 1, the at least one retention component being formed from metal.

6. The fiber optic cable assembly of claim 1, further including a ferrule attached to the at least one optical waveguide.

7. The fiber optic cable assembly of claim 6, wherein the ferrule is a portion of a connector assembly.

8. The fiber optic cable assembly of claim 1 being a portion of a hardened connector.

9. The fiber optic cable assembly of claim 8, the hardened connector including a shroud for protecting a ferrule.

10. A fiber optic cable assembly for terminating a fiber optic cable, comprising:
the fiber optic cable having at least one optical waveguide and a jacket;
a first retention component and a second retention component with the first and second retention components being attached to a portion of the jacket of the fiber optic cable to form a retention component sub-assembly; and
a retention body having an insertion end and a passage extending at least partially along a length of the retention body, wherein the retention component sub-assembly is inserted into the passage so that the at least one retention component is secured to the retention body.

11. The fiber optic cable assembly of claim 10, wherein at least one of the first and second retention components comprises a plurality of teeth for gripping the jacket.

12. The fiber optic cable assembly of claim 10, wherein the at least one of the first and second retention components is pressed into the jacket.

13. The fiber optic cable assembly of claim 10, wherein at least one of the first and second retention components comprises at least one mechanical locking feature for engaging with the retention body.

14. The fiber optic cable assembly of claim 13, wherein the at least one mechanical locking feature is a raised portion of the at least one retention components.

15. The fiber optic cable assembly of claim 10, wherein the at least one of the first and second retention components comprises at least one an alignment feature.

16. The fiber optic cable assembly of claim 10, at least one of the first and second retention components is formed from metal.

17. The fiber optic cable assembly of claim 10, further including a ferrule attached to the at least one optical waveguide.

18. The fiber optic cable assembly of claim 17, wherein the ferrule is a portion of a connector assembly.

19. The fiber optic cable assembly of claim 18 being a portion of a hardened connector.

20. The fiber optic cable assembly of claim 19, the hardened connector including a shroud for protecting a ferrule.

21. A fiber optic cable assembly for terminating a fiber optic cable, comprising:
the fiber optic cable having at least one optical waveguide and a jacket;
a first retention component and a second retention component with the first and second retention components being attached to a portion of the jacket of the fiber optic cable to form a retention component sub-assembly, wherein at least one of the first and second retention components comprises at least one mechanical locking feature; and
a retention body having an insertion end and a passage extending at least partially along a length of the retention body, wherein the retention component sub-assembly is inserted into the passage so that the at least one retention component is secured to the retention body using the mechanical locking feature.

22. The fiber optic cable assembly of claim 21, wherein the at least one mechanical locking feature is a raised portion of the at least one retention components.

23. The fiber optic cable assembly of claim 21, wherein at least one of the first and second retention components comprises a plurality of teeth for gripping the jacket.

24. The fiber optic cable assembly of claim 21, wherein the at least one of the first and second retention components is pressed into the jacket.

25. The fiber optic cable assembly of claim 21, wherein the at least one of the first and second retention components comprises at least one an alignment feature.

26. The fiber optic cable assembly of claim 21, at least one of the first and second retention components is formed from metal.

27. The fiber optic cable assembly of claim 21, further including a ferrule attached to the at least one optical waveguide.

28. The fiber optic cable assembly of claim 27, wherein the ferrule is a portion of a connector assembly.

29. The fiber optic cable assembly of claim 28 being a portion of a hardened connector.

30. The fiber optic cable assembly of claim 29, the hardened connector including a shroud for protecting a ferrule.

31. A method of terminating a fiber optic cable, comprising:
providing a fiber optic cable having at least one optical waveguide and a jacket;
providing a first retention component and a second retention component, wherein at least one of the first and second retention components comprises at least one mechanical locking feature;
pressing the first retention component and the second retention component into the jacket of the fiber optic cable to form a retention component sub-assembly;
providing a retention body comprising an insertion end and a passage extending at least partially along a length of the retention body; and
inserting a first end of the fiber optic cable of the retention component sub-assembly into the passage of the retention body so that the at least one retention component is secured to the retention body using the at least one mechanical locking feature.

32. The method of claim 31, further including the step of attaching a ferrule to the at least one optical waveguide.

33. The method of claim 32, wherein the ferrule is a portion of a connector assembly.

34. The method of claim 31, further comprising the step of assembling a hardened connector about the terminated fiber optic cable.

35. The method of claim 34, wherein the hardened connector includes a shroud for protecting a ferrule.

36. The fiber optic cable assembly of claim 1, wherein the at least one retention component comprises rails and tabs, wherein the plurality of teeth is disposed on respective rails, and the rails are inboard of the tabs.

37. The fiber optic cable assembly of claim 11, wherein each of the first retention component and the second retention component comprises at least one rail and at least one tab, the plurality of teeth is disposed on the at least one rail, and the at least one rail is inboard of the at least one tab.

* * * * *